United States Patent [19]

James et al.

[11] Patent Number: 5,150,031

[45] Date of Patent: Sep. 22, 1992

[54] BATTERY CHARGING SYSTEM

[75] Inventors: Gordon W. James, Plantation; Joseph F. Sheridan, Davie; Wayne Moy, Coral Springs, all of Fla.

[73] Assignee: Motorola, Inc., Schaumburg, Ill.

[21] Appl. No.: 252,419

[22] Filed: Sep. 30, 1988

[51] Int. Cl.⁵ .................................................. H02J 7/00
[52] U.S. Cl. .................................... 320/2; 320/39; 455/89
[58] Field of Search .............................. 379/60–63; 455/89, 90; 320/2, 13, 14, 39

[56] References Cited

U.S. PATENT DOCUMENTS

| | | | |
|---|---|---|---|
| 3,852,652 | 12/1974 | Jasinski | 320/35 |
| 4,006,396 | 2/1977 | Bogut | 320/2 |
| 4,588,938 | 5/1986 | Liautaud et al. | 320/2 |
| 4,593,155 | 6/1986 | Hawkins | 379/62 |
| 4,636,741 | 1/1987 | Mitzlaff | 455/89 X |
| 4,673,861 | 6/1987 | Dubovsky et al. | 455/89 X |
| 4,680,527 | 7/1987 | Benenati et al. | 320/2 |
| 4,684,870 | 8/1987 | George et al. | 320/20 |
| 4,698,579 | 10/1987 | Richter et al. | 320/14 |
| 4,700,375 | 10/1987 | Reed | 379/61 |
| 4,709,202 | 11/1987 | Koenck et al. | 320/43 |
| 4,710,693 | 12/1987 | Wigell | 320/2 |
| 4,710,694 | 12/1987 | Sutphin et al. | 320/21 |
| 4,724,528 | 2/1988 | Eaton | 364/715 |
| 4,737,702 | 4/1988 | Koenck | 320/40 |
| 4,740,754 | 4/1988 | Finger | 324/428 |
| 4,742,290 | 5/1988 | Sutphin et al. | 320/21 |
| 4,746,854 | 5/1988 | Baker et al. | 320/40 |
| 4,766,361 | 8/1988 | Pusateri | 320/2 |
| 4,767,977 | 8/1988 | Fasen et al. | 320/20 |

FOREIGN PATENT DOCUMENTS 47538 11/1978 Japan.

OTHER PUBLICATIONS

General Electric Company, "Nickel-Cadmium Battery Application Handbook", 3rd ed., 1986 Section 3.7, 4.5.3.

Alan, "What to look for in a nickel-cadmium charger", Mobile Radio Technology, Jun. 1987, pp. 30–32.

Primary Examiner—R. J. Hickey
Attorney, Agent, or Firm—Pablo Meles; Thomas G. Berry

[57] ABSTRACT

A battery charging unit communicates with an operational device while contemporaneously charging a battery to power the device. The device provides information to the charging unit indicating its present operational status, which enables the charging unit to determine the magnitude of the proper charging current under such operating conditions. In this way, battery life is maximized while battery charging time is minimized.

15 Claims, 2 Drawing Sheets

BATTERY CHARGING SYSTEM

TECHNICAL FIELD

This invention relates generally to battery charging units for rechargeable batteries, and more specifically to battery charging units operable in vehicles to permit battery charging while contemporaneously powering an operating device.

BACKGROUND

Portable devices routinely depend upon batteries as a power source. To ease battery replacement costs, rechargeable batteries have found wide utility in powering contemporary consumer and business products. For example, nickel cadmium batteries may be repeatedly used to energize computers, radios, pagers and other such devices.

An important element of any reliable battery charging system is the battery charging unit. Ideally, a battery charging unit should maintain a constant charging current regardless of any variations in the load current of the battery being charged. While this may not be difficult for static battery chargers (i.e., stationary battery chargers charging batteries not contemporaneously powering an operating device), maintenance of a constant charging current for a vehicular charging unit proves quite difficult since the device under power may draw varying amounts of current. For example, a two-way radio may draw a large amount of current when transmitting, and significantly less current while receiving. Further, lesser variations in load current may exist while the device is operating in a single mode. Thus, a two-way radio in the receive mode may draw varying amounts of current depending upon the speaker volume setting or other such operator adjusted controls.

Historically, vehicular battery charging units have operated either to make gross current changes (i.e., from trickle charge to rapid charge) responsive to manual controls on the charging unit itself, or to maintain a fixed charger current regardless of the load current of the device. This later approach is particularly undesirable since maintenance of a fixed charger current greater than the ideal charging current may result in overcharging and overheating the battery, which typically results in reduced battery life. Conversely, maintenance of a low charger current, for example, a continuous trickle charge, may result in insufficient charging of the battery or, in certain circumstances, further discharging the battery to supply the required current load. Accordingly, a need exists in the art for a battery charging unit that maintains an optimum battery charging current, regardless of battery load current, thereby maximizing battery life.

SUMMARY OF THE INVENTION

Accordingly, it is an object of the present invention to provide a battery charging unit that overcomes the detriments of the prior art.

Briefly, according to the invention, a battery charging unit communicates with an operational device while contemporaneously charging a battery to power the device. The device provides information to the charging unit indicating its present operational status, which enables the charging unit to determine the magnitude of the proper charging current under such operating conditions. In this way, battery life is maximized while battery charging time is minimized.

DETAILED DESCRIPTION OF THE PREFERRED EMBODIMENT

Figure 1:
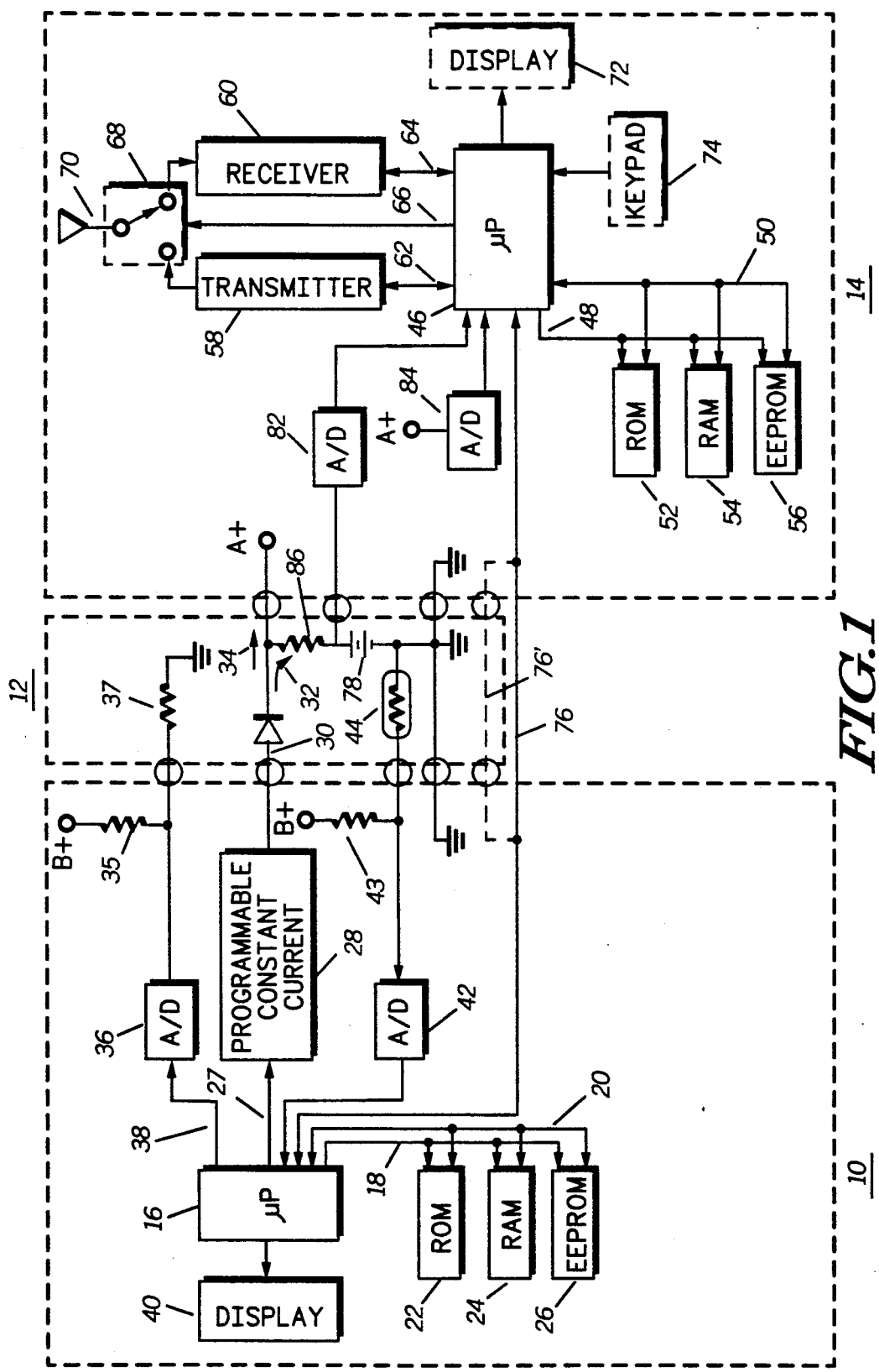
FIG. 1 is a block diagram of a battery charging system in accordance with the present invention.

Referring to FIG. 1, there is shown a battery charging system comprising a battery charging unit (10), a battery (12), and a battery powered device (e.g. radio 14). The battery powered device may operate either solely upon battery power, or using power supplied by the charging unit (10) while the battery (12) is being charged. A particularly useful arrangement of the present invention may be had when the charging unit (10) is installed in a vehicle to permit a portable radio (14) to be used within the vehicle while the radio's battery 12, is being recharged.

As can be seen by reference to FIG. 1, the charging unit (10) comprises a microprocessor (16), which communicates via an address bus (18) and a data bus (20) with a sufficient amount of read-only memory (ROM) (22), random access memory (RAM) (24), and electronically erasable programmable read-only memory (EEPROM) (26). Preferably, the operational instructions (program) for the charging unit (12) reside in the ROM (22), while temporary and semi-permanent information is stored in the RAM (24) and EEPROM (26), respectively. Additionally, the charging unit (10) includes a programmable via line (27) constant current source (28), which provides a current signal (30) consisting of a charging current (32) to charge the battery (12), and a supply current (34) to power the radio (14). The charging unit (10) also preferably includes a display (40) so that an operator may be provided with information such as the progress of the charging operation. Finally, the battery charging unit (10) includes two analog-to-digital (A/D) converters (36 and 42), which may be used to gather information useful to determining the charging current and the fully charged state of the battery. First, the A/D converter (42) operates in conjunction with a biased (through resistor 43) thermistor (44) within the battery (12) to determine the internal temperature of the battery. As is known in the art, this temperature information may be used to determine the fully charged state of the battery (12). Secondly, the A/D converter (36) operates in conjunction with a biased (by resistor 35) "coding" resistor (37), which may provide battery model (or battery type) information as is known in the art. This information may be used to determine the magnitude of the charging current or detect the battery's fully charged state.

Further reference to FIG. 1 illustrates that the radio (14) comprises a transmitter (58) and a receiver (60), which are controlled (via lines 62 and 64 respectively) by a microprocessor (46). The microprocessor (46) communicates via an address bus (48) and a data bus (50) with a sufficient amount of ROM (52), RAM (54) and EEPROM (56). Further, the microprocessor (46) controls (via line 66) an antenna switch (68), which selectively couples either the transmitter (58) or the receiver (60) to an antenna (70). According to the invention, the radio (14) is able to determine the battery charging current by analyzing digital (from A/D converters 82 and 84) versions of the voltage on both sides of a resistor (86), which is serially connected with the battery cells (78). In this way, the radio (14) may provide feedback to the charging unit (10) so as to facilitate the maintenance of a constant charging current. Alternately, the resistor (86) (and hence the charging current) could be monitored by the charging unit itself. Optionally, the radio (14) may include a display (72) and keypad (74) to provide information to or receive commands from an operator of the radio (14).

According to the invention, the microprocessor (46) of the radio (14) is coupled to the microprocessor (16) of the charging unit (10) so as to permit data to be exchanged via a serial data link (76). Preferably, the serial data link (76) is routed outside the battery (12), which permits conventional batteries to be used with the present invention. Thus, FIG. 1 illustrates a conventional battery (12) consisting of at least one cell (78), which receives the charging current (32). Alternately, the serial data link (76') could be routed through the battery as shown.

As is known, the battery (12) includes a diode (80) which prevents the supply current (30) from being discharged into the programmable constant current source (28). Also, the battery (12) includes the "coding" resistor (37), which permits battery model information to be determined by the charging unit. Further, a second resistor (86) facilitates determination of the actual charging current either by the radio (14) or the charging unit (10). Preferably, the current monitoring resistor (86) comprises the internal resistance of a temperature activated fuse, which is used in conventional batteries as a safety measure. Finally, a thermistor (44) provides information regarding the internal temperature of the battery which may be use to aid determination of the battery's charging time.

Operationally, the radio (14) communicates with the charging unit (10) via the serial data link (76) to provide information regarding, for example, the radio's type or model number, or information regarding the radio's operational status, such as, transmitting; receiving with standby with or other control codes which may represent widely varying parameters such as speaker volume setting, power output limitations and the like. In any event, the charging unit (10) uses this data to determine the magnitude of the supply current (30) so as to maintain a constant charging current (32), while allowing for wide and rapid variation in the radio's supply current (34). Thus, differing radio models may operate within widely varying minimum and maximum supply currents. Further, the present invention permits both major adjustments (i.e., between transmitting and receiving) and fine adjustments (e.g., between speaker volume levels) to be rapidly made to the supply current (34), while maintaining a constant charging current (32). In this way, the battery (12) may be charged without overcharging or overheating the battery, thereby maximizing the battery's useful life. Moreover, the operational status information provided via the serial data link (76) may be used in conjunction with data regarding the actual charging current as measured (82, 84, 86, 46) within the battery. Lastly, the operational status information may be used with conventional charging techniques, for example, digitized (by A/D converter 42) battery temperature (44) to minimize battery charging time.

Figure 2:
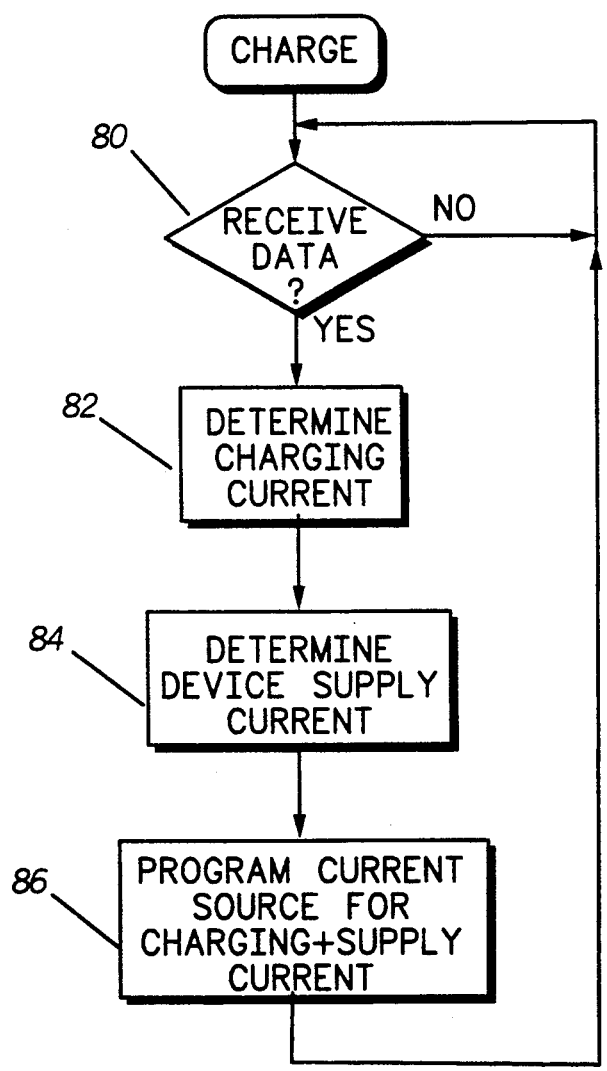
FIG. 2 is a flow diagram illustrating the steps executed by the charging unit of FIG. 1.

Referring to FIG. 2, a flow diagram illustrating the steps executed by the charging unit (10) is shown. The routine begins at step 80 by determining whether data has been received from the radio (14). According to the invention, data may be received either by request or command to the radio. However, should the radio (14) fail to provide the data within a time interval following a command for information, the charging unit may determine that the radio is off, which causes the supply current to be programmed at zero. In any event, once data has been received, the charging unit (10) processes the data to determine (82) the proper charging current for the particular radio (device) and battery. Following this, the charging unit determines in step 84 the proper supply current by processing the data to discover the present operational status of the radio. Once the level (magnitude) of the charging and supply currents have been determined, the charging unit (step 86) programs the programmable constant current source (28) to provide a current signal approximately equal to the arithmetic sum of the charging and supply currents. After programming has been completed, the routine returns to decision (step 80) to await additional data so that the supply current may again be adjusted in response to any change in the operational status of the radio.

What is claimed is:

1. A method for charging a battery while contemporaneously supplying power to a device, comprising the steps of:
   at a charging unit:
   (a) obtaining data from the device via a serial data link coupled between the charging unit and the device;
   (b) processing said data to determine an operational state of the device, said operational state comprising a charging current to said battery and a supply current to said device;
   (c) adjusting a current source in response to said operational state of the device to provide a current signal; and
   (d) providing said current signal approximately equal to the arithmetic sum of the charging and supply currents to the device and the battery so as to contemporaneously charge the battery and supply power to the device.

2. The method of claim 1, wherein step (a) comprises the steps of:
   (a1) requesting said data from the device;
   (a2) receiving said data from the device.

3. The method of claim 1, wherein step (a) comprises the steps of:
   (a1) transmitting a command code to the device;
   (a2) receiving said data from the device.

4. The method of claim 1, wherein step (c) comprises the steps of:
   (c1) determining a programming code in response to said operational state of the device;
   (c2) transmitting said programming code to a programmable current source.

5. The method of claim 1, wherein step (d) comprises the step of providing a constant charging current and a variable supply current so as to contemporaneously charge the battery and supply power to the device.

6. A method for charging a battery while contemporaneously supplying power to a device, comprising the steps of:
   at a charging unit:
   (a) receiving data from the device via a serial data link coupled between the charging unit and the device;

(b) processing said data to determine an operational state of the device, said operational state comprising a charging current to said battery and a supply current to said device; and (c) adjusting a current source in response to said operational state of the device to provide a current signal;

at the device:

(a) providing said data to said charging unit;

(b) receiving at least a portion of said current signal from said charging unit;

at the battery:

(a) receiving at least a portion of said current signal from said charging unit.

7. The method of claim 6, wherein step (a) of said charging unit comprises the steps of:

(a1) requesting said data from the device;

(a2) receiving said data from the device.

8. The method of claim 6, wherein step (a) of said charging unit comprises the steps of:

(a1) transmitting a command code to the device;

(a2) receiving said data from the device.

9. The method of claim 6, wherein step (c) of said charging unit comprises the steps of:

(c1) determining a programming code in response to said operational state of the device;

(c2) transmitting said programming code to a programmable current source.

10. The method of claim 6, wherein step (a) of the device comprises providing data representing at least a model code of the device.

11. The method of claim 6, wherein step (a) of the device comprises providing data representing at least a status code of the device.

12. A battery charging system, comprising:

a serial data link;

means for receiving data via the serial data link from a device having a battery;

means for operating on said data to determine an operational status of said device;

a power source for providing a current signal consisting of a charging current and a supply current, the magnitude of said current signal being a function of said operation status; and, means for controlling said power current source, said means for controlling being coupled to said means for operating.

13. The battery charging unit of claim 12, wherein said power source comprises a constant current source.

14. The battery charging unit of claim 12, which includes means, coupled to said controlling means and the device, for determining at least the magnitude of said charging current within said battery.

15. The battery charging unit of claim 12, which includes means, coupled to said controlling means and said battery, for determining at least the magnitude of said charging current within said battery.

* * * * *